United States Patent [19]

Wormser

[11] 4,325,357
[45] Apr. 20, 1982

[54] SOLAR ENERGY AND GROUND-WATER COOLING DEVICES

[76] Inventor: Eric M. Wormser, 88 Foxwood Rd., Stamford, Conn. 06903

[21] Appl. No.: 149,270

[22] Filed: May 12, 1980

[51] Int. Cl.³ .................................................. F24J 3/02
[52] U.S. Cl. .................................... 126/427; 126/435; 126/437; 165/45
[58] Field of Search .............. 126/428, 421; 165/48 S, 165/45; 62/2

[56] References Cited

U.S. PATENT DOCUMENTS

| | | | |
|---|---|---|---|
| 3,782,132 | 1/1974 | Lohoff | 165/45 |
| 3,977,601 | 8/1976 | Bearzi | 126/421 |
| 4,034,738 | 7/1977 | Barber | 126/428 |

*Primary Examiner*—Samuel Scott
*Assistant Examiner*—G. Anderson
*Attorney, Agent, or Firm*—William G. Rhines

[57] ABSTRACT

This invention relates to devices and methods for heating and cooling, which may include solar energy heating devices and direct heating by solar energy, utilizing ground water in connection with a heat pump and/or one or more direct coils to effectuate desired heating or cooling.

7 Claims, 7 Drawing Figures

SOLAR ENERGY AND GROUND-WATER COOLING DEVICES

BACKGROUND OF INVENTION

In the field of solar energy, various apparatus and methods have been proposed to utilize the sun's radiant energy as a heat source. Apparatus by which the sun's energy may be utilized may be combined into systems having other heating sources, such as heat pumps of known per se design. Apparatus of that type may also be utilized as a means for cooling, as by discontinuing the heating phase of the solar energy constituent while utilizing the heat pump component in "reverse" operation as a heat dissipator. In this connection, reference is made to U.S. Pat. Nos. 4,030,312, and 4,012,920. Well-water, river water, or the like, may be used as a primary source for both the heating and the cooling phases of a heat-pump component of a temperature modifying apparatus. In this connection, reference is made to U.S. Pat. Nos. 3,028,735 and 3,036,441. Ground water may also be used as a means to supply the heat source or heat discharge medium to a heat pump (according to whether heating or cooling respectively are desired), to heat or to cool water in a storage tank that is also supplied by solar heating sources. In this connection, reference is made to the July, 1976 issue of the publication *Airconditioning and Refigeration Business,* and the article therein "Giant Housing Project - Water Source Heat Pumps Make Solar Practical", (Penton/IPC Inc.)

Prior art apparatus, however, do not make it possible to achieve the economics, lower investment costs, and efficiencies which are obtainable with apparatus in accordance with the present invention, because the present invention uniquely provides apparatus and methods by which a variety of operational modes may be effectuated.

SUMMARY OF INVENTION

Embodiments of the present invention include apparatus having solar energy collectors, a hot water storage tank, a plenum for channeling fan actuated air into the living, office or other space to which temperature modified air is to be delivered, a direct coil exposed to the air column in the plenum, a water source heat pump having an air treatment coil in the plenum air column, an earth water source such as a well, aquifer, etc., and various associated pumps and valves, by means of which it is possible to cause the tank water to heat the direct coil directly, or to cause the collectors to feed the heat pump with water to be used as a heat source, or to cause ground water to feed the heat pump to be used as a heat source, or to cause ground source water to be fed directly to the direct coil as a cooling source, or to cause water from the ground water source to be used as a primary feed to the heat exchanger, instead of or in addition to being a direct source to the direct coil, as a cooling source for air passing through the plenum.

DESCRIPTION OF PREFERRED EMBODIMENTS

Figure 1:
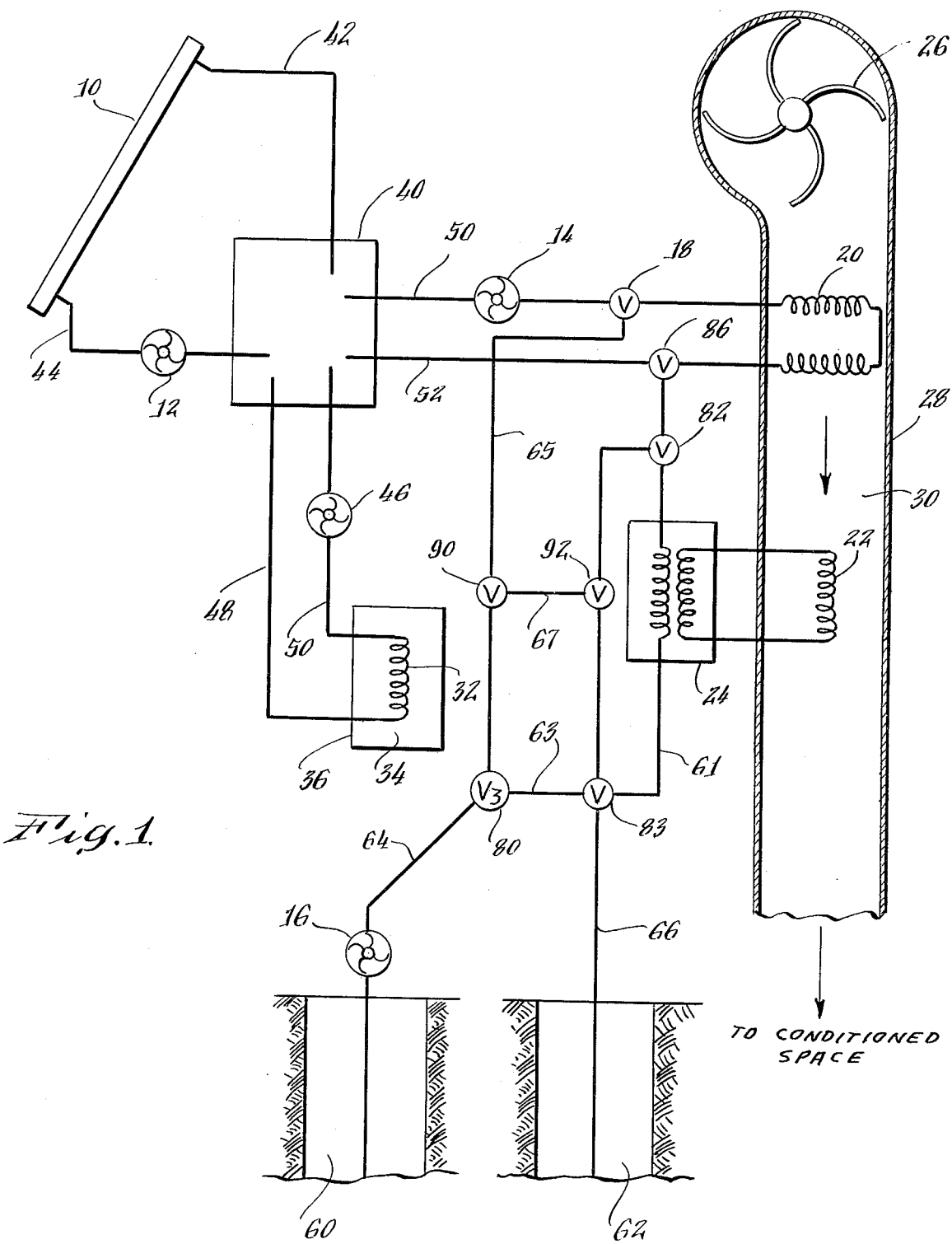
FIG. 1 depicts an embodiment of the present invention.

Referring first to FIG. 1, there is depicted one or more solar energy collectors, in the form of panels 10 or other devices of known per se design. The hot water output of these devices may be caused to be fed to the storage tank 40 by means of water being urged through the conduits 42, 44, by the pump 12. Water stored in the tank 40 may be used as source for heating domestic water 34 in the holding tank 36, through operation of the pump 46 causing water to pass through the conduits 48, 50 and the heat exchange coil 32.

Figure 2:
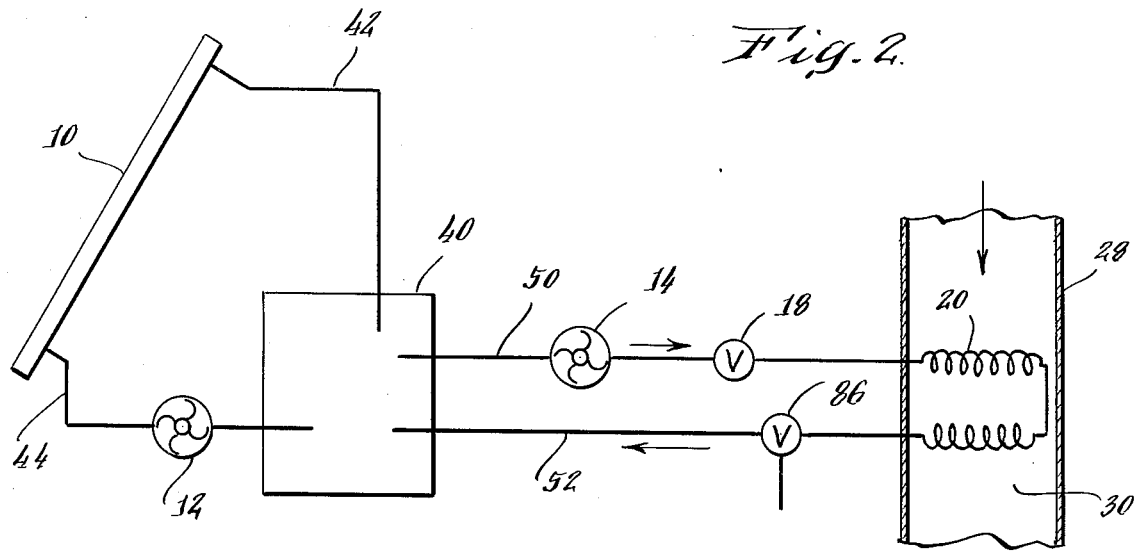
FIG. 2 depicts portions of the embodiment of this invention shown in FIG. 1, utilized in a first mode of operation.

In addition, with the valves 18, 86 properly positioned to permit such water flow, as illustrated in FIG. 2, water from the storage tank 40 may be impelled by the pump 14 through the conduits 50, 52 and the direct coil 20. As used herein "direct coil" means a heat exchange coil for transferring heat directly from one fluid to another (e.g., water, air, "anti-freeze", etc.) without utilizing an intermediate fluid or apparatus (e.g., a heat pump). By this means, actuation of the fan 26 will cause air 30 to pass through the plenum 28, and to be heated by the direct coil 20 as the air 30 passes into the space to which such temperature modified air is to be delivered. This mode of operation is particularly useful when the water in the tank 40 is above 90° F.

Figure 3:
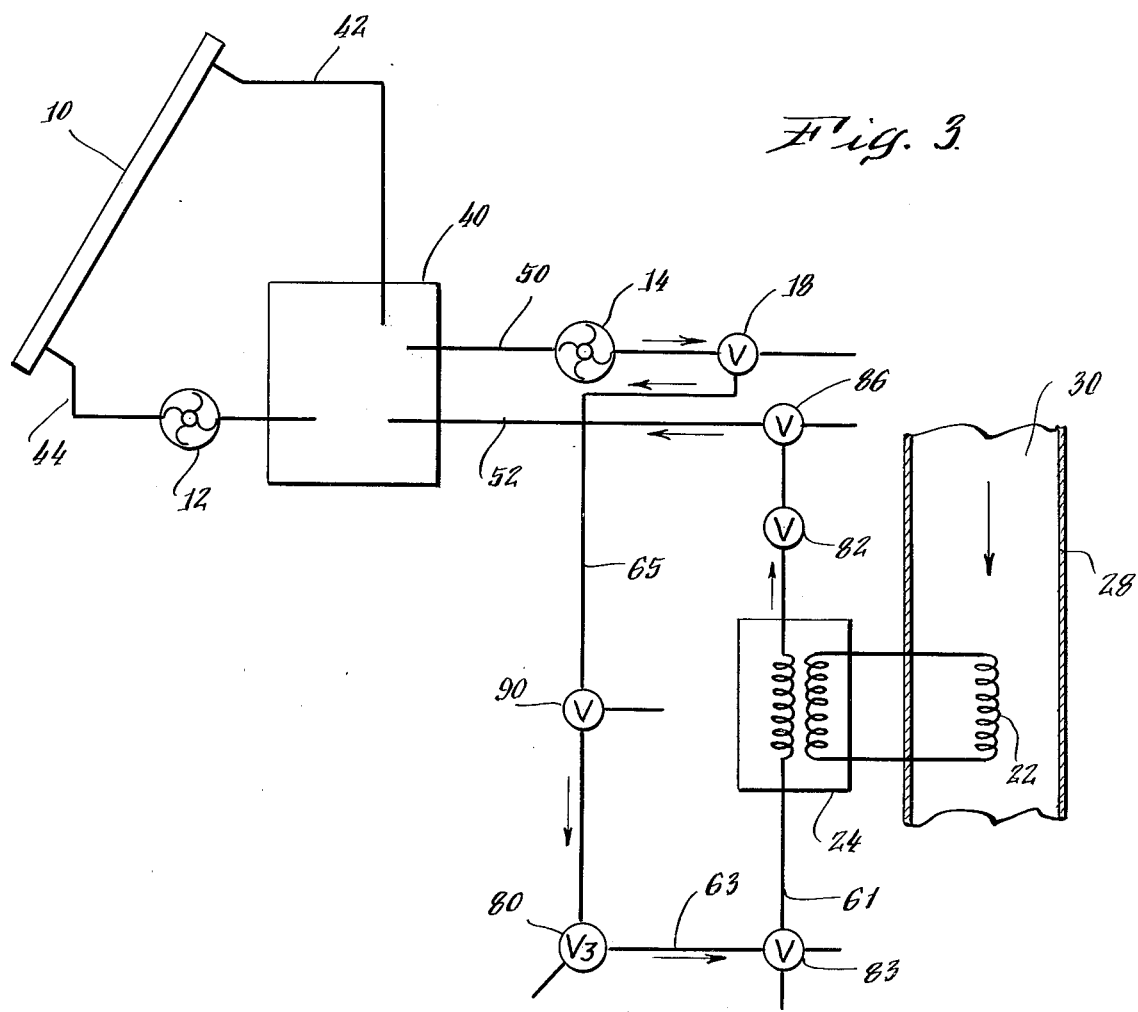
FIG. 3 depicts portions of the embodiment of this invention shown in FIG. 1, utilized in a second mode of operation.

However, the water in the storage tank 40 may not be sufficiently hot to effectuate such heating, but may nevertheless have some degree of heat, as, for example, where cloudy skies have reduced the water heating capability of the panels 10. If the water temperature in the tank 40 is in the range of 45° F. to 90° F., its temperature may be raised to a level satisfactory to effectuate heating by repositioning the valves 10, 86, and by positioning the valves 90, 80, 83, 82, so as to cause the water to feed the heat pump 24. The heat pump compression cycle (heating mode) causes the heat pump coil 22 to be at a sufficiently elevated temperature to heat the air 30 passing through the plenum 28 while extracting heat from the solar heated water in the range 90° F. to 45° F. passing through the water coil of the heat pump. This is illustrated in FIG. 3, showing how partially heated water in the tank 40 may be moved by the pump 14, through conduit 50, valve 18, conduit 65, valves 90, 80, 83, Conduits 63, 61, heat pump 24 (in the heating compression mode), valves 82, 86, and conduit 52, back to the tank 40.

Figure 4:
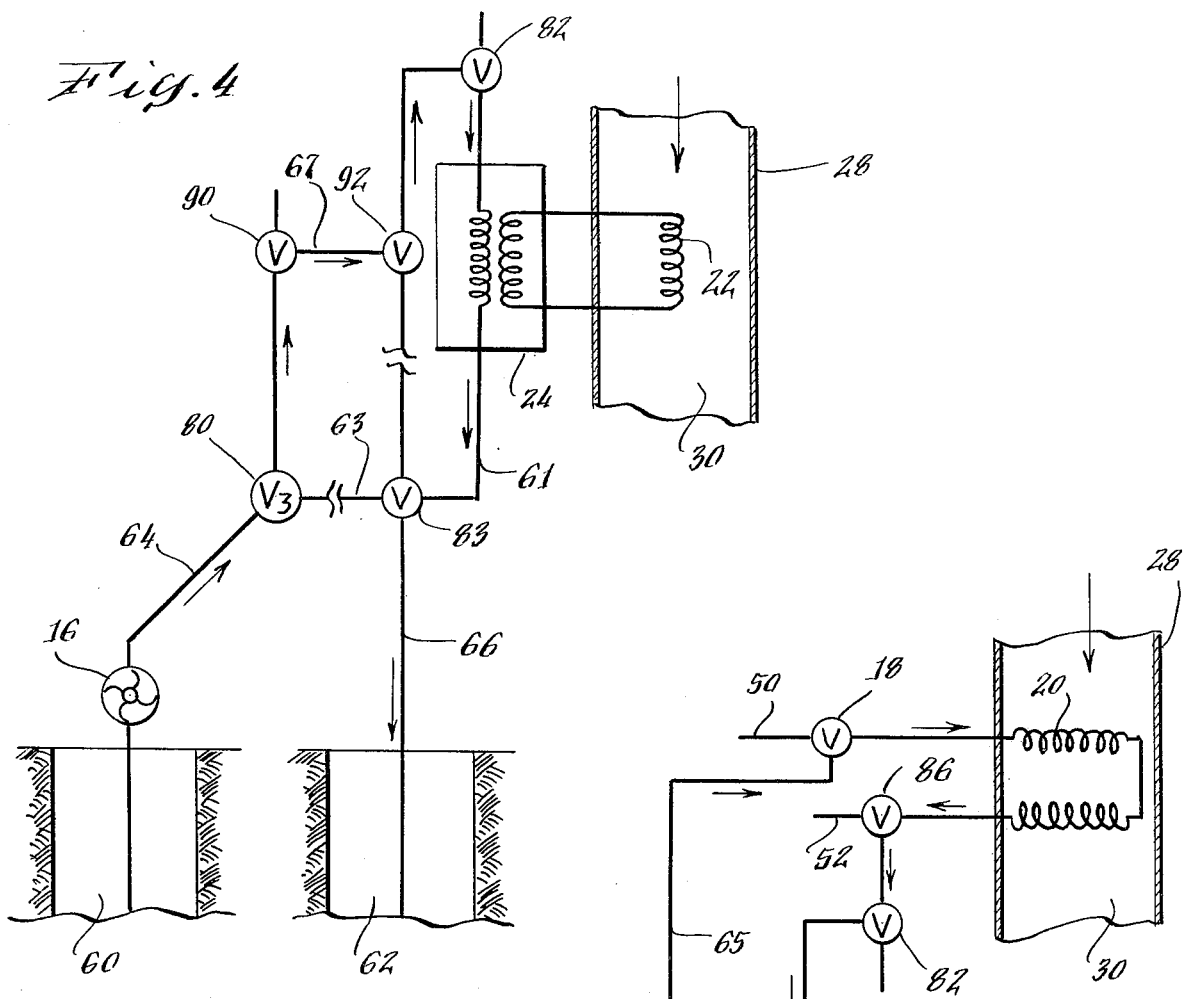
FIG. 4 depicts portions of the embodiment of this invention shown in FIG. 1, utilized in a third mode of operation.

Similarly, if the temperature in the tank 40 is below 45° F. and is too low for the heat pump 24 to operate effectively, ground water from a source well 60 in an aquifer, or other underground source, may be utilized for heating purposes. It is known that the temperature of such water usually is about the average temperature of a region for a year, and that, thus, in the region of southern New England, for example, such water will typically be in the range of 50° F.–54° F. Although there are small seasonal variations in such temperature (e.g., 2° F. to 4° F.), the variations tend to lag behind the seasons, and thus such water is somewhat warmer than the norm throughout most of the winter season, and is somewhat cooler than the norm throughout most of the summer season. Utilization of this phenomenon is advantageous for both the heating utilization and the cooling herein described. The means by which the present invention makes use of it is illustrated in FIG. 4. In order to be at best advantage, the source well 60 should be sufficiently deep that the effects of ambient surface temperatures will be minimized; say, on the order of about 25 feet or more. There is also provided a return or injection well 62, by which used water may be returned to the aquifer. The injection well 62 may be somewhat shallower, and removed from the extraction well 60, to facilitate dissipation of the returned water into the aquifer. Using such groundwater as a heat source is accomplished by actuation of valves 80, 90, 92, 82 and 83, and the pump 16, with consequent flow of water through those valves and the conduits 64, 67 to feed the heat pump 24, and to return the water to the injection well 62 via the conduits 61, 66 and the valve 83. The heat pump 24 heating cycle extracts heat from the ground water and supplies heat at increased temperature to the coil 22 positioned in the air duct 28.

Figure 5:
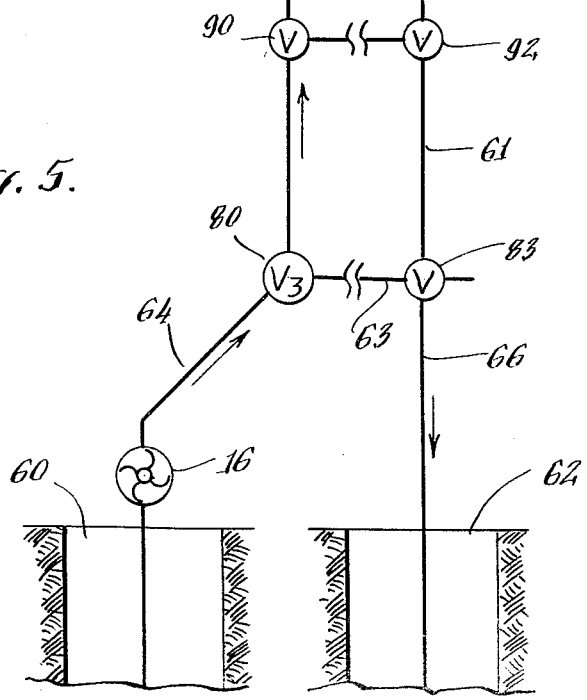
FIG. 5 depicts portions of the embodiment of this invention shown in FIG. 1, utilized in a fourth mode of operation.

The same apparatus and groundwater source may also be used for direct cooling and dehumification purposes, as shown in FIG. 5. Again, by actuation of the pump 16, water may be pumped from the groundwater source 60 through conduit 64, valves 80 and 90, conduit 65, valve 18, direct coil 20, valves 86, 82, 92, and 83, and conduits 61 and 66, to the return well 62. By this means the coil 20 is utilized as a direct cooling coil. Typically, such cooling will be called for when the area to be cooled is at about 78° F. or over, at which time the water temperature may be about 50° F.

Figure 6:
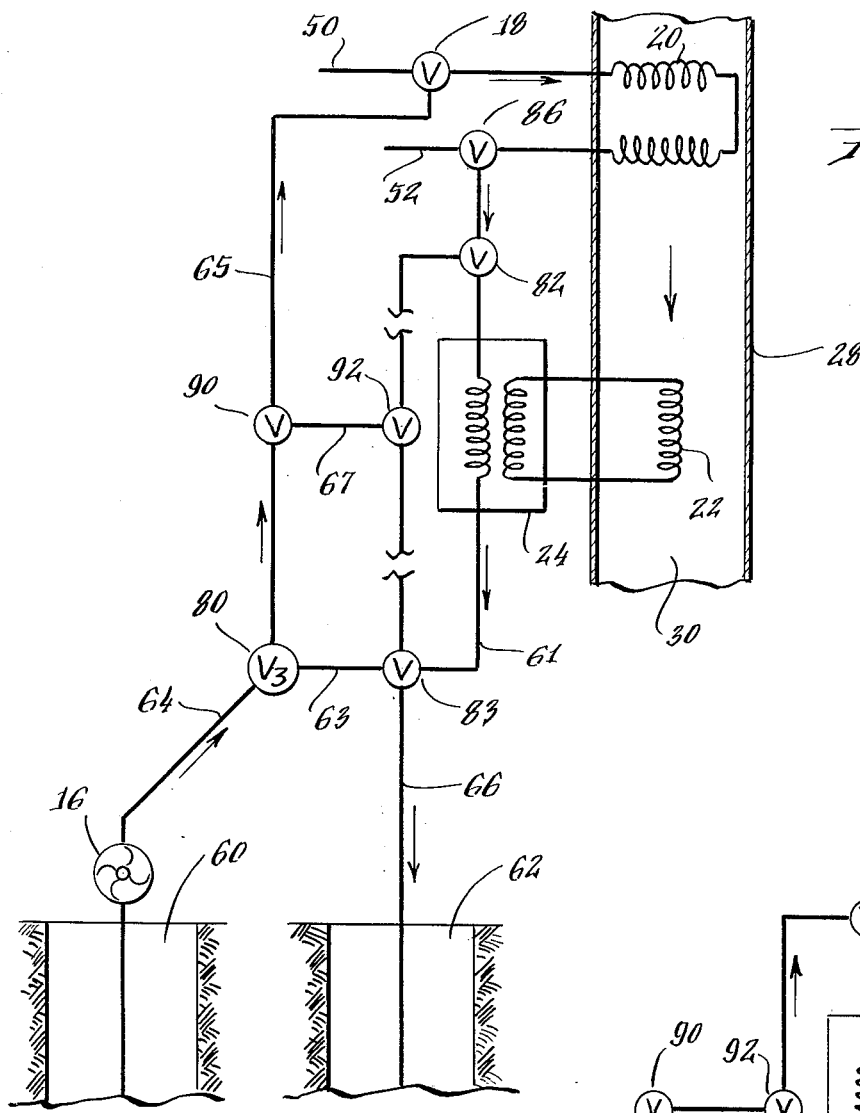
FIG. 6 depicts portions of the embodiment of this invention shown in FIG. 1, utilized in a fifth mode of operation.

If the apparatus shown in FIG. 5 is not sufficient for cooling to the desired level, then, as shown in FIG. 6, it may be augmented by adjusting the values 82, 83 so as to cause water to pass through the heat pump 24 and conduit 61 while the pump 24 is "reversed" from its previously described heat-augmenting (compression) state, into a cooling-augmenting (evaporation) mode of operation. The heat pump when operating in the cooling mode removes heat from the air 30 passing through the plenum 28 over heat pump evaporation coil 22, thus further cooling the air. The heat removed from the air by coil 22 is transferred to the water cooled compression coil in the heat pump 24. Cool ground water after having passed through the direct cooling coil 20 is diverted by valve 86 and valve 82 to pass through the heat pump compression coil to remove the additional heat generated by the heat pump as it passes through conduit 64, valves 80 and 90, conduit 65, valve 18, direct coil 20, valves 86 and 82, heat pump 24, and valve 83, and to return to the injection well 62 via conduits 61, 66.

Figure 7:
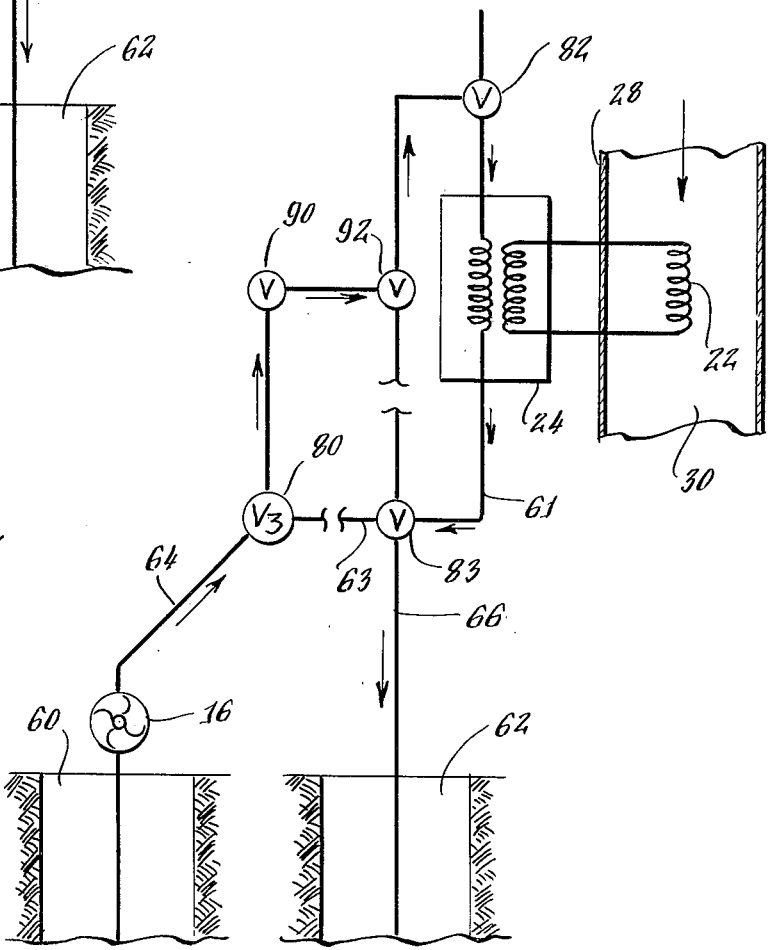
FIG. 7 depicts portions of the embodiment of this invention shown in FIG. 1, utilized in a sixth mode of operation.

Through proper adjustment of the valves 90 and 92 it is also possible to have heat pump augmented cooling in lieu of, rather than in addition to, the direct coil cooling previously described. FIG. 7 shows Mode #6, the cooling mode with groundwater feed only to the heat pump which is in a "reversed" (evaporation and cooling) operating mode. In this mode, the pump 16 extracts water from the source well 60, and propels it through conduits 64, valves 80, 90, 92, and 82, heat pump 24, conduit 61, valve 83, and conduit 66, to the return well 62.

As is well known in the field, the aforesaid apparatus may be, and desirably will be, augmented by supplemental heating means, such as an oil or gas furnace, or electric heat source, (not shown), so that the water in the storage tank 40 and/or the auxiliary tank 36, and/or the air passing through the plenum, may be heated at times when the amount of heat otherwise available is not adequate. Thus, for example, phenomena which cause the temperature of the solar-heated water to drop below normal operational limits, for example, at a time when there has been a protracted lack of sunshine, might necessitate the use of such supplementary heat sources.

It is to be understood that the embodiments herein described and illustrated are by way of illustration and not of limitation, and that other embodiments of this invention may be made without departing from the spirit or scope of this invention. Accordingly, although the embodiments hereinbefore described show single coils, heat pumps, and fans, for example, it is within the contemplation of this invention that such elements singly or in combination may be in multiple as well as in single units, of the fin-coil type or distributed heat pump types, with or without direct heat exchanger coils.

I claim:

1. Apparatus for modifying the temperature of air comprising
   radiant energy collection means for heating liquid,
   storage tank means for storing liquid heated by said radiant energy collection means,
   an air plenum having an associated air impeller means,
   a direct coil positioned in said plenum for imparting temperature change to air passing therethrough,
   first pump means for propelling liquid from and back to said storage tank means,
   heat pump means for extracting heat from liquid passing therethrough when the heat pump means is operating in the compression heating mode and for imparting heat to liquid passing therethrough when the heat pump means is operating in the evaporation cooling mode, said heat pump means having an associated heat pump coil positioned in said plenum for imparting heat to air passing therethrough when said pump is operating in the compression heating mode and for extracting heat from air passing therethrough when said pump is operating in the evaporation cooling mode,
   ground-water source means and ground-water return means having a second pump means associated therewith for propelling ground-water from said source means to said return means,
   and associated valve means and conduit means for selectively directing the flow of liquid from said storage tank means to either of said direct coil and said heat pump means, and from said ground-water source means to either as well as both of said direct coil and said heat pump means.

2. The apparatus described in claim 1 wherein said radiant energy collection means comprises one or more solar panels.

3. The apparatus described in claim 1, including auxiliary means for supplying heat to the liquid which feeds said direct coil.

4. In apparatus for modifying the temperature of air comprising
radiant energy collection means for heating liquid,
storage tank means for storing liquid heated by said radiant energy collection means,
an air plenum having an associated air impeller means,
a direct coil positioned in said plenum for imparting temperature change to air passing therethrough,
first pump means for propelling liquid from and back to said storage tank means,
heat pump means for extracting heat from liquid passing therethrough when the heat pump means is operating in the compression heating mode and for imparting heat to liquid passing therethrough when the heat pump means is operating in the evaporation cooling mode, said heat pump means having an associated heat pump coil positioned in said plenum for imparting heat to air passing therethrough when said pump is operating in the compression heating mode and for extracting heat from air passing therethrough when said pump is operating in the evaporation cooling mode,
and associated valve means and conduit means for selectively directing the flow of liquid from said storage tank means to either of said direct coil and said heat pump means and then back to said storage tank means,
ground-water source means and ground-water return means having a second pump means associated therewith for propelling ground-water from said source means to said return means,
and associated valve means and conduit means for selectively directing the flow of liquid from said ground-water source means to either as well as both of said direct coil and said heat pump means and then to said ground-water return means.

5. In apparatus for modifying the temperature of air, ground-water source means and ground-water return means,
heat pump means interconnected with associated air heat exchange means, whereby, when said heat pump is operated in the compression heating mode, heat may be extracted from water being supplied to said heat pump and imparted to said air heat exchanger, and when said heat pump is operated in the evaporation cooling mode, heat may be extracted from said air heat exchanger and imparted to water being supplied to said heat pump,
a direct coil air heat exchange means comprising a heat exchange coil for transfering heat directly from one fluid to another without utilizing an intermediate fluid or apparatus,
and valve means and conduit means for selectively directing the flow of water from said ground-water source means to either, as well as both of, said direct coil and heat pump means and then to said ground-water return means.

6. A method of modifying the temperature of air comprising the steps of
extracting ground-water from a source,
causing said extracted ground-water to pass through heat transfer means which includes a heat exchange coil positioned in the plenum of an air duct,
and returning said ground-water to the earth,
wherein said step of causing said extracted ground-water to pass through said heat transfer means comprises causing said extracted water to pass through a direct heat exchange coil for transfering heat directly between said ground-water and the air in said plenum without utilizing an intermediate fluid or apparatus.

7. The method described in claim 6 wherein said step of causing said extracted ground-water to pass through said heat transfer means comprises causing said extracted water to pass through both said direct heat exchange coil and through the water feed of a heat pump of the water source type.

* * * * *